United States Patent

Kato

[11] Patent Number: 5,963,356
[45] Date of Patent: Oct. 5, 1999

[54] SCANNING OPTICAL APPARATUS

[75] Inventor: Manabu Kato, Kawasaki, Japan

[73] Assignee: Canon Kabushiki Kaisha, Tokyo, Japan

[21] Appl. No.: 08/844,596

[22] Filed: Apr. 21, 1997

Related U.S. Application Data

[63] Continuation of application No. 08/418,438, Apr. 7, 1995, abandoned.

[30] Foreign Application Priority Data

Apr. 11, 1994 [JP] Japan ................... 6-096963

[51] Int. Cl.$^6$ .................................................. G02B 26/08
[52] U.S. Cl. .......................... 359/216; 250/234; 359/205
[58] Field of Search .................... 359/216, 217, 359/218, 219, 205, 206, 207; 250/234, 235, 236; 347/259, 260, 261; 358/296

[56] References Cited

U.S. PATENT DOCUMENTS

| | | | |
|---|---|---|---|
| 4,179,183 | 12/1979 | Tateoka et al. | 359/206 |
| 4,850,663 | 7/1989 | Yamamoto et al. | 359/218 |
| 4,933,549 | 6/1990 | Fujioka et al. | 250/235 |
| 4,978,849 | 12/1990 | Goddard et al. | 250/235 |
| 5,245,462 | 9/1993 | Kanai et al. | 359/216 |
| 5,260,570 | 11/1993 | Nakamura et al. | 250/235 |
| 5,267,075 | 11/1993 | Yamaguchi et al. | 359/216 |
| 5,270,851 | 12/1993 | Makino et al. | 359/216 |
| 5,371,608 | 12/1994 | Muto et al. | 250/236 |
| 5,412,501 | 5/1995 | Fisli | 250/205 |

FOREIGN PATENT DOCUMENTS

| | | | |
|---|---|---|---|
| 464556 | 1/1992 | European Pat. Off. | |
| 0292312 | 11/1989 | Japan | 359/218 |
| 1282516 | 11/1989 | Japan | |
| 0087806 | 4/1991 | Japan | 359/205 |
| 0448123 | 9/1991 | Japan | 359/218 |
| 6003610 | 6/1992 | Japan | |
| 404281421 | 10/1992 | Japan | 359/216 |
| 5364547 | 12/1993 | Japan | |

*Primary Examiner*—My-Trang Nu Ton
*Attorney, Agent, or Firm*—Fitzpatrick, Cella, Harper & Scinto

[57] ABSTRACT

A scanning optical apparatus includes a light source portion, a deflector for deflecting a beam from the light source portion, a first optical element for converting the beam from the light source portion into a nearly parallel beam, a second optical element for focusing the nearly parallel beam into a linear image on a deflection/reflection facet of the deflector, a third optical element for converging a beam deflected by the deflector on a predetermined surface, a detecting element for detecting the beam deflected by the deflector, and a fourth optical element for guiding the beam deflected by the deflector to the detecting element, wherein the fourth optical element and the second optical element are integrally formed.

16 Claims, 6 Drawing Sheets

SCANNING OPTICAL APPARATUS

This application is a continuation of application Ser. No. 08/418,438 filed Apr. 7, 1995, abandoned.

BACKGROUND OF THE INVENTION

1. Field of the Invention

The present invention relates to a scanning optical apparatus, and more particularly to a scanning optical apparatus suitably applicable, for example, to apparatus such as laser beam printers (LBP) or digital copiers including the electrophotographic process in which an optically modulated beam (light beam) emitted from light source means is deflected and reflected by a deflecting device (optical deflector) consisting of a rotary polygon mirror etc. and thereafter a scanned surface is optically scanned therewith through an imaging device (fθ lens) having the fθ characteristics to record image information.

2. Related Background Art

In conventional scanning optical apparatus such as laser beam printers the light source means emits the optically modulated beam according to an image signal. Then the optically modulated beam is periodically deflected by the optical deflector, for example, consisting of the rotary polygon mirror, thereafter the beam is converged in a spot shape on a surface of a photosensitive recording medium (photosensitive drum) by an imaging optical system having the fθ characteristics, and the surface is optically scanned with the beam to effect image recording.

FIG. 1 is a schematic drawing to show major part of a conventional scanning optical apparatus.

In the drawing a divergent beam emitted from the light source means 51 is converted into a nearly parallel beam by a collimator lens 52, a stop 53 limits the beam (quantity of light), and the thus shaped beam is incident into a cylindrical lens 54 having a predetermined refractive power only in a sub-scan direction normal to the plane of the drawing. Among the parallel beam incident into the cylindrical lens 54, the beam is emergent in a state of parallel beam as it is in a cross section along the main scan direction parallel to the plane of drawing. In contrast, the beam is converged in a cross section of sub scan to form a nearly linear image on a deflection/reflection facet 55a of the optical deflector 55 consisting of the rotary polygon mirror.

Then the beam deflected and reflected by the deflection facet 55a of the optical deflector 55 is guided through an imaging optical system (fθ lens) 56 onto a surface of photosensitive drum 58 as a scanned surface, and the surface of the photosensitive drum 58 is optically scanned with the beam in the main scan direction by rotating the optical deflector 55 in the direction of arrow A, thereby recording image information.

In order to adjust a scan start position on the surface of photosensitive drum 58, prior to the optical scan on the surface of photosensitive drum 58, part of the beam deflected and reflected by each deflection facet of the optical deflector 55 is let to pass a region before a region where the beam for scanning the surface of photosensitive drum 58 passes and then is reflected by a return mirror (BD mirror) 57 to be guided to a detection device (BD sensor) 59 for obtaining a scan start signal (or for obtaining a synchronizing signal of image writing start position). Then utilizing an output signal from the detection device 59 (detection signal of image writing start position (BD signal)), the scan start position of image recording onto the surface of photosensitive drum 58 is adjusted.

In the conventional scanning optical apparatus the part of beam deflected and reflected by the optical deflector 55 is guided through the fθ lens 56 to the BD sensor 59 in order to obtain the detection signal of image writing start position, i. e, the so-called BD signal.

The scanning optical apparatus of such a structure necessitated that a distance from the fθ lens 56 to the BD sensor 59 was made equal to the focal length of the fθ lens 56, so that the entire apparatus was likely to become large in size.

In the case of the conventional scanning optical apparatus, the fixed BD mirror 57 is provided as a part of an optical system (synchronous detection system) for obtaining the scan start signal to the scanned surface 58, as shown in FIG. 1, so that the BD mirror 57 properly bends an optical path of the beam (BD beam) for detection signal of image writing start position (synchronizing signal) passing through the fθ lens 56, thereby permitting the entire apparatus to be formed in a compact shape.

Such scanning optical apparatus, however, had problems: the adjustment of writing start position must be performed precisely because the image writing start position could deviate depending upon mounting accuracy of the BD mirror 57; an optically effective region in the main scan direction, of the fθ lens 56 was not allowed to be expanded because the BD beam was focused using the lens region (the region other than the region where the scanning beam passes) of a part of fθ lens 56, etc. Thus, these problems made difficult compatibility of size reduction and cost reduction of the scanning optical apparatus.

SUMMARY OF THE INVENTION

An object of the present invention is to provide a scanning optical apparats which can perform optical scanning with high accuracy while decreasing the size of the entire apparatus, by integrally forming an optical element (BD lens consisting of an anamorphic lens) for focusing a beam for obtaining a synchronizing signal of image writing start position to a scanned surface (BD beam) and an optical element (cylindrical lens) for focusing a beam in a linear pattern extending in the main scan direction.

Besides, another object of the present invention is to provide a scanning optical apparatus the whole of which is made compact and simplified by locating the detection element (BD sensor) for obtaining the scan start signal near the light source means (semiconductor laser) and setting the light source means, an electric circuit for controlling it, and the BD sensor on a common electric board or flexible board.

The scanning optical apparatus of the present invention involves a scanning optical apparatus comprising a first optical element for converting a beam emitted from light source means into a nearly parallel beam, a deflecting element for deflecting the beam emitted from the light source means, a second optical element for focusing the parallel beam to form a linear image extending in the main scan direction on a deflection facet of the deflecting element, a third optical element for focusing the beam deflected by the deflecting element to form a spot image on a scanned surface, and a fourth optical element for focusing a part of the beam deflected by the deflecting element to form an image on a surface of a detection element for obtaining a synchronizing signal of image writing start position onto the scanned surface, wherein the second optical element and the fourth optical element are integrally formed as a composite optical element.

Particularly, the apparatus is featured in that the composite optical element is composed of a cylindrical lens and an anamorphic lens, that the light source means, the electric circuit for controlling the light source means, and the detection element are placed on a same electric board, or that the light source means and the detection element are combined through a flexible board.

Further, the scanning optical apparatus of the present invention is arranged in such an arrangement that during such optical scanning that the beam emitted from light source means is converted into a parallel beam through a collimator lens, that the parallel beam is converged by a cylindrical lens in a main scan section on a deflection facet of an optical deflector to be deflected and reflected by the deflection facet, and that thereafter the reflected beam is guided through an imaging optical system onto a scanned surface to effect optical scanning, which is characterized in that a part of the beam deflected and reflected by the deflection facet of the optical deflector is guided by an anamorphic lens provided separately from the imaging optical system to a detection element for obtaining a scan start signal onto the scanned surface and in that the cylindrical lens and the anamorphic lens are integrally formed as a composite optical element.

DETAILED DESCRIPTION OF THE PREFERRED EMBODIMENTS

Figure 1:
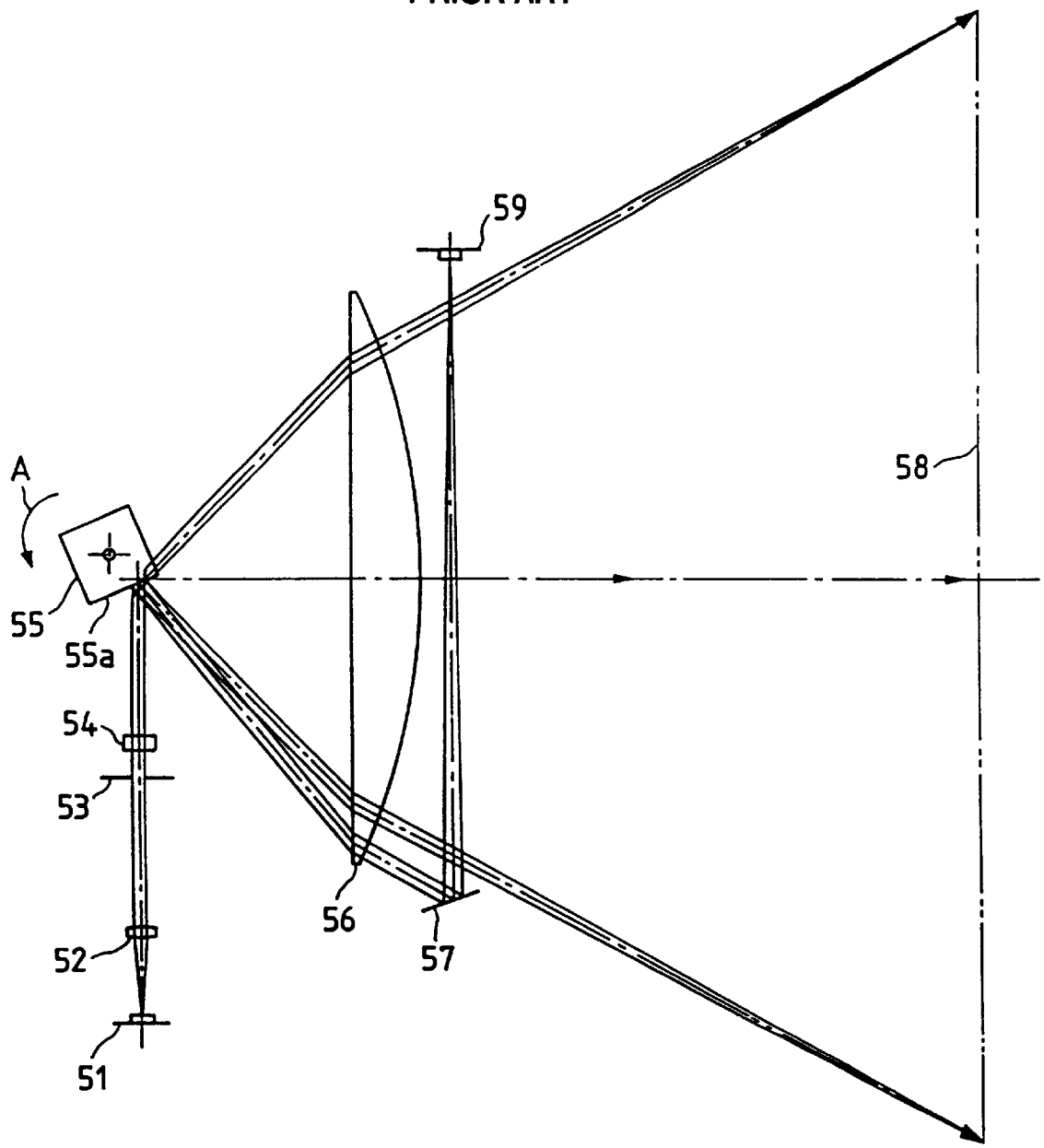
FIG. 1 is a schematic drawing to show major part of a conventional scanning optical apparatus.
Figure 2:
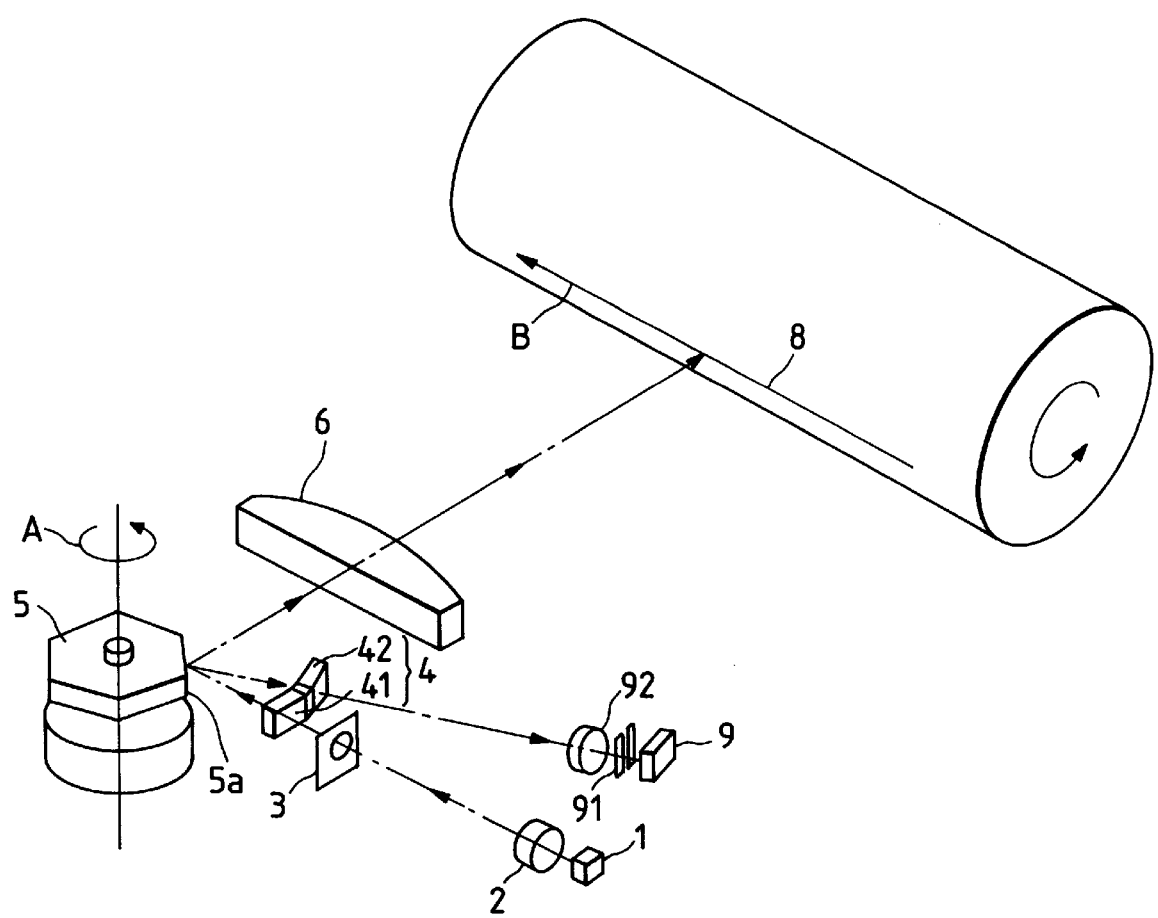
FIG. 2 is a schematic drawing to show major part of Embodiment 1 of the scanning optical apparatus of the present invention.
Figure 3:
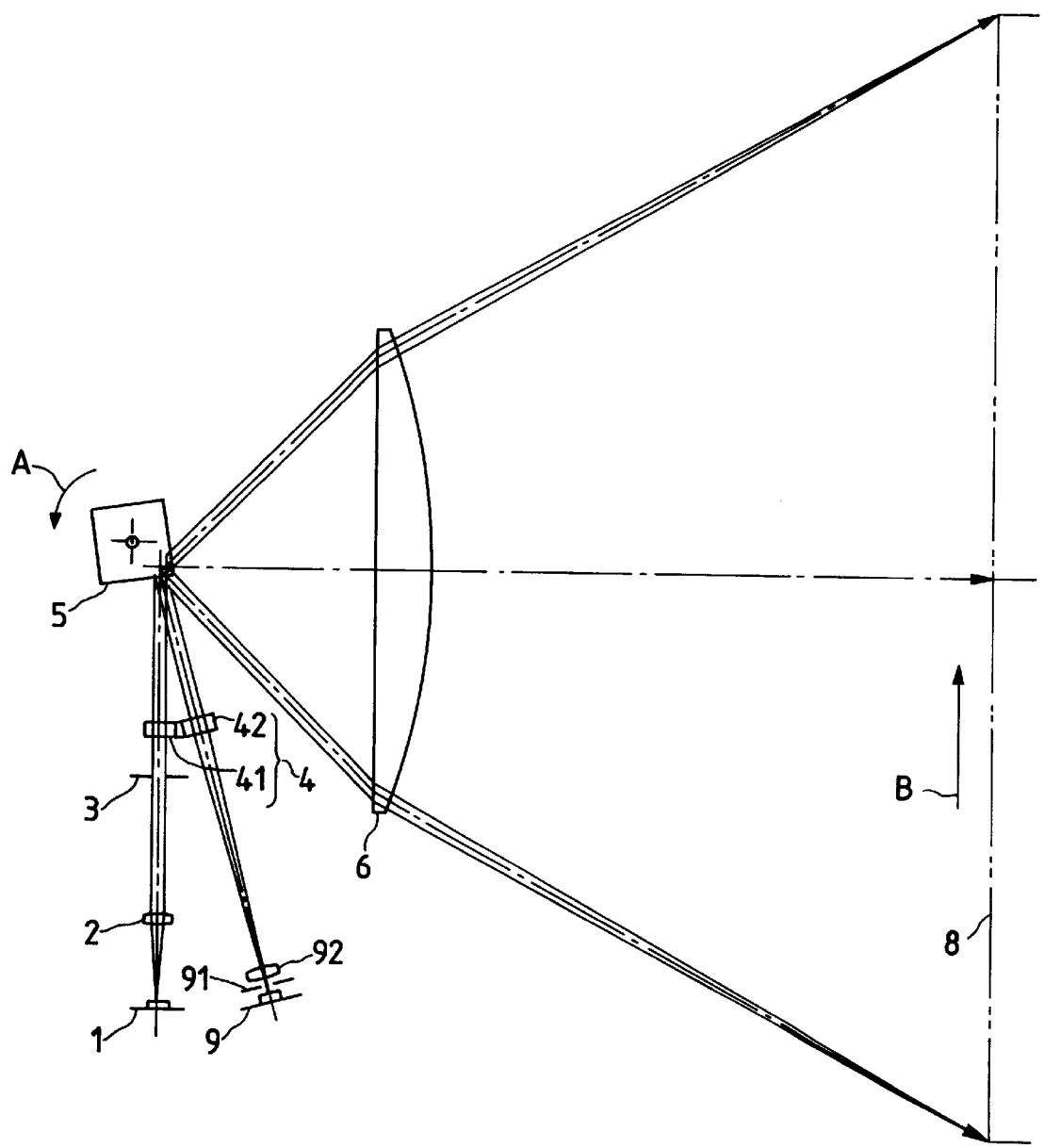
FIG. 3 is a cross section of the major part in the main scan direction of Embodiment 1 of the present invention.

FIG. 2 is a schematic drawing to show major part of Embodiment 1 of the scanning optical apparatus of the present invention, and FIG. 3 is a cross section of the major part in a main scan section of FIG. 2.

In the drawings, reference numeral 1 designates a light source means, which is for example a semiconductor laser. As detailed later, the present embodiment is so arranged that the light source means 1, an electric circuit for controlling it (laser driver), and a BD sensor 9 as a detection element for obtaining the scan start signal onto a scanned surface (or for obtaining a synchronizing signal of image writing start position) are placed on a same electric board or on a same flexible board.

Numeral 2 denotes a collimator lens as the first optical element, which converts a beam (light beam) emitted from the light source means 1 into a nearly parallel beam. Numeral 3 denotes an aperture stop to shape the size of passing beam.

Numeral 4 represents a composite optical element, in which a cylindrical lens (cylindrical lens portion) 41 as the second optical element and a BD lens (BD lens portion) 42 consisting of an anamorphic lens as the fourth optical element are integrally formed. The cylindrical lens 41 has a predetermined refractive power only in the sub scan direction normal to the plane of FIG. 3, which thus converges the beam passing through the stop 3 in the sub scan section to form a nearly linear image on a deflection facet of an optical deflector 5 described below. The BD lens 42 has different refractive powers between in the main scan direction and in the sub scan direction, which focuses the beam (BD beam) for obtaining the synchronizing signal of image writing start position to form an image on the BD sensor 9 as the detection element described below.

Numeral 5 designates the optical deflector consisting, for example, of a rotary polygon mirror as the deflection element, which is rotated by a drive means (not shown) such as a motor at a constant speed in the direction of arrow A in the drawing.

Numeral 6 is an imaging lens (fθ lens) having the fθ characteristics as the third optical element, which has different refractive powers between in the main scan direction in which the beam is scanned by the deflector and in the sub scan direction normal to the main scan direction, which focuses the beam based on image information after deflected and reflected by the rotary polygon mirror 5 to form an image on the surface of photosensitive drum 8 as a recording medium being a scanned surface, and which corrects surface skew of the deflection facet of the rotary polygon mirror 5. The fθ lens 6 and the composite optical element 4 are provided separately from each other.

Numeral 9 denotes the BD sensor (photosensor) as the detection element, which is provided on FL same electric board (not shown) as the light source means 1 is, which detects the beam (BD beam) for detection signal (synchronizing signal) of image writing start position as reflected by each deflection facet of the optical deflector 5 in order to detect the timing of scan start position on the surface of photosensitive drum 8 before starting the optical scanning on the surface of photosensitive drum 8, and which controls the timing of scan start position of image recording onto the surface of photosensitive drum 8, based on the detection. In other words, the detection element 9 detects the synchronizing signal for determining the timing of modulation start of the light source means 1.

Numeral 92 is an auxiliary BD lens, which is provided near the BD sensor 9 and which corrects deviation of the BD beam in the sub scan direction due to mounting errors of the composite optical element 4, the BD sensor 9, etc. Here, the auxiliary BD lens 92 can be obviated by enhancing the mounting accuracy of components such as the composite optical element 4 and the BD sensor 9. Numeral 91 is a slit member having an aperture in the main scan direction.

In the present embodiment the beam emitted from the semiconductor laser 1 is converted into a nearly parallel beam by the collimator lens 2, the aperture stop 3 limits the beam (quantity of light), and the thus shaped beam is incident into the cylindrical lens 41 in the composite optical element 4. Among the parallel beam incident into the cylindrical lens 41, the beam in the main scan section parallel to the plane of FIG. 3 is emergent in a state of parallel beam as it is. In contrast, the beam in the sub scan section normal to the main scan section is converged to form a nearly linear image (a linear image extending in the main scan direction) on the deflection facet 5a of the optical deflector 5. Then the beam deflected and reflected by the deflection facet 5a of the optical deflector 5 is guided through the fθ lens 6 onto the surface of photosensitive drum 8, and the surface of photosensitive drum 8 is optically scanned in the direction of arrow B by rotating the optical deflector 5 in the direction of arrow A, thereby performing image recording.

In the present embodiment, prior to start of optical scanning on the surface of photosensitive drum 8, a part of the beam deflected and reflected by each deflection facet of the optical deflector 5 is guided to the BD sensor 9 by the BD lens 42 in the composite optical element 4 and the auxiliary BD lens 92 in order to adjust the scan start position on the surface of photosensitive drum 8. Then utilizing an output signal (detection signal of image writing start position (BD signal)) from the BD sensor 9, the scan start position of image recording onto the surface of photosensitive drum 8 is adjusted.

Figure 4:
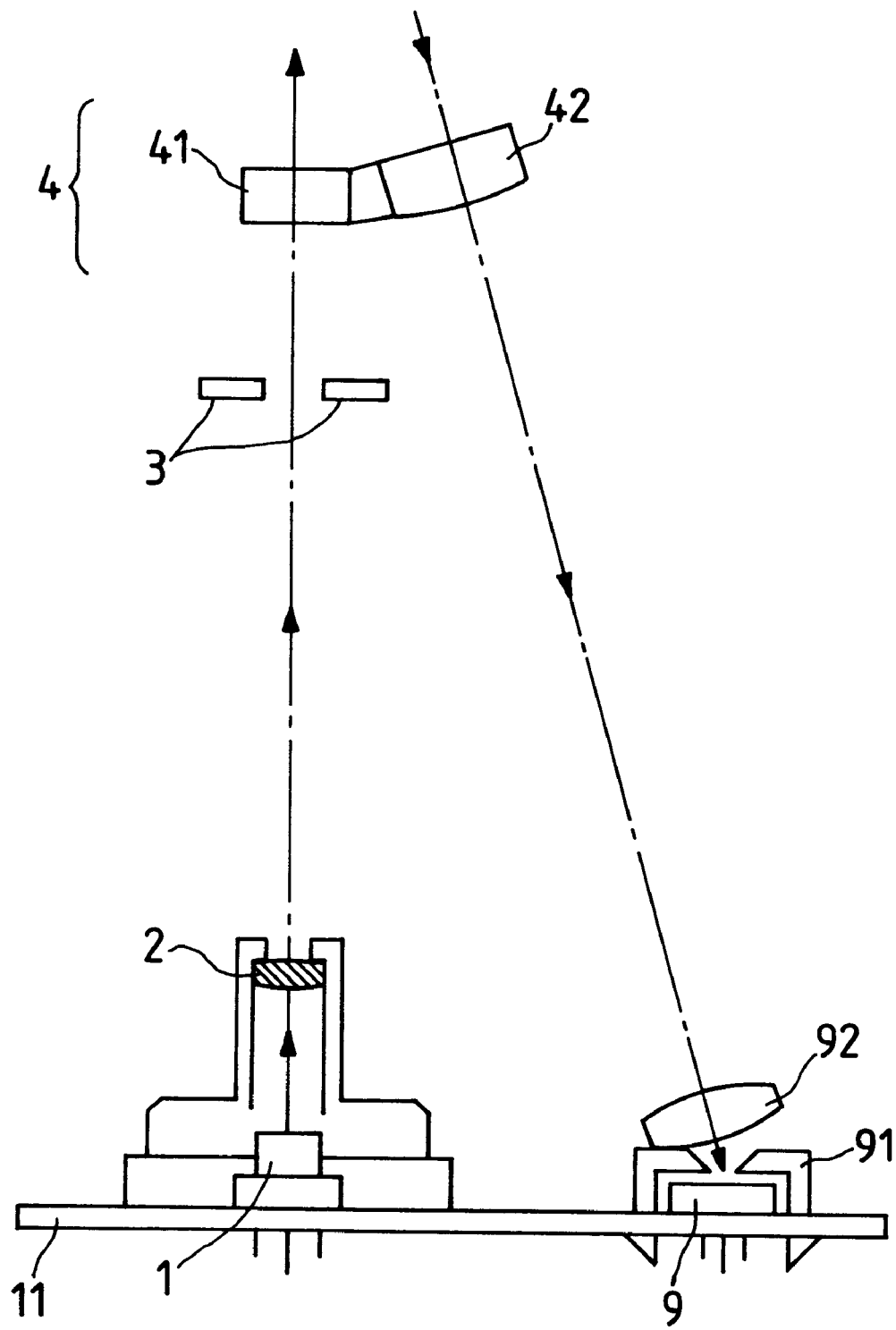
FIG. 4 is an enlarged, explanatory drawing (a cross section of major part in the main scan direction) near the light source means and BD sensor in Embodiment 1 of the present invention.

FIG. 4 is an enlarged, explanatory drawing (a cross section in the main scan direction) near the light source means 1 and BD sensor 9 in the present embodiment. In FIG. 4, the same elements as those shown in FIG. 2 are denoted by the same reference numerals.

In FIG. 4, as described above, a part of the beam (BD beam) deflected and reflected by the rotary polygon mirror (not shown) is let to pass as a synchronizing signal for detection of image writing start position through the BD lens 42 in the composite optical element 4 and the auxiliary BD lens 92, and then is let to pass through the BD slit 91 as a slit member to form an image on the surface of BD sensor 9. Then utilizing the output signal (BD signal) from the BD sensor 9, the scan start position of image recording onto the surface of photosensitive drum is adjusted.

Here, the BD sensor 9 is placed together with the semiconductor laser 1 as the light source means and the electric circuit (laser driver) not shown for controlling it on a same electric board 11, as shown in FIG. 4. Further, the auxiliary BD lens 92 and BD slit 91 are also incorporated with the electric board 11 so as to correct deviation of the BD beam in the sub scan direction due to the mounting errors of the composite optical element 4, the BD sensor 9, etc. It is noted here that this auxiliary BD lens 92 can be obviated by increasing the mounting accuracy of components such as the composite optical element 4 and the BD sensor 9, as described previously.

As described above, the present embodiment is so arranged that the cylindrical lens 41 and the BD lens 42 are integrally formed and further that the semiconductor laser 1, the electric circuit; for controlling it, and the BD sensor 9 are placed on the same electric board 11, whereby the optical system (synchronous detection system) and electric system for obtaining the synchronizing signal of image writing start position can be constructed in a compact configuration, thus achieving a low-cost scanning optical apparatus.

Figure 5:
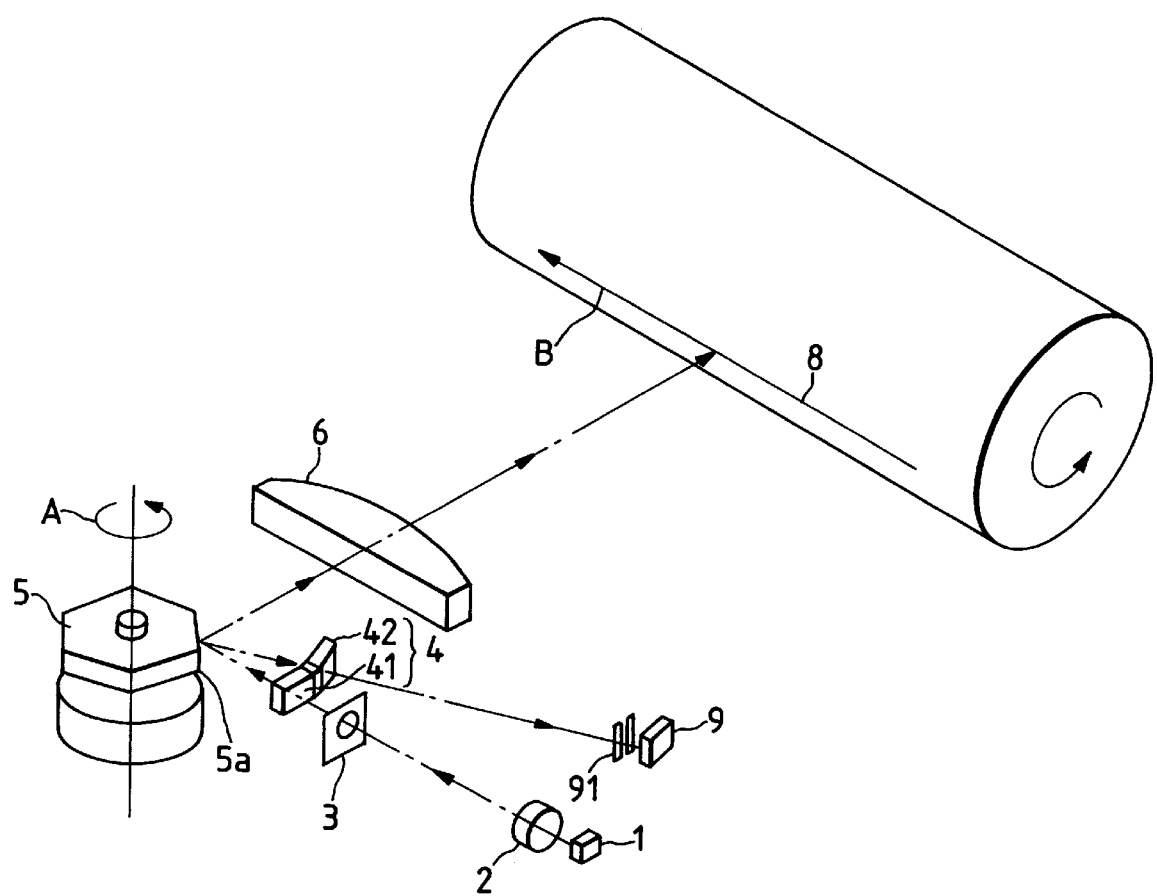
FIG. 5 is a cross section of major part of Embodiment 2 of the scanning optical apparatus of the present invention.

FIG. 5 is a schematic drawing to show the major part of Embodiment 2 of the scanning optical apparatus of the present invention. In FIG. 5, the same elements as those shown in FIG. 2 are denoted by the same reference numerals, and description thereof is omitted herein.

Figure 6:
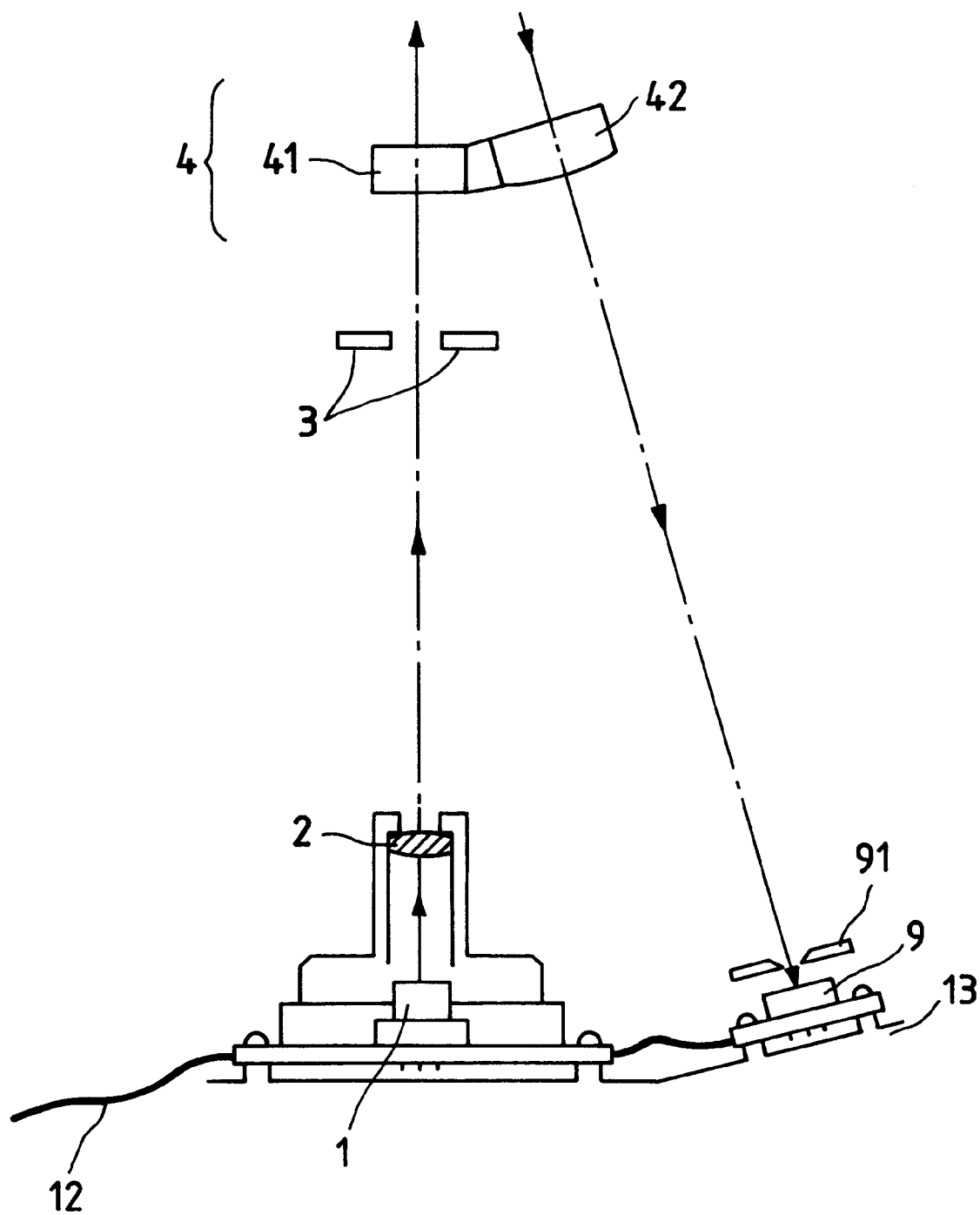
FIG. 6 is an enlarged, explanatory drawing (a cross section of major part in the main scan direction) near the light source means and BD sensor in Embodiment 2 of the present invention.

FIG. 6 is an enlarged, explanatory drawing (a cross section in the main scan direction) near the light source means 1 and BD sensor 9 in Embodiment 2 of the present invention. In FIG. 6, the same elements as those shown in FIG. 4 are denoted by the same reference numerals.

Differences of the present embodiment from Embodiment 1 as described above are that the light source means 1 and the BD sensor 9 are combined by a flexible board 12 and that the light source means 1 and the BD sensor 9 each are fixed to an optical box 13, and the other structure and optical functions are substantially the same as in Embodiment 1, thereby achieving the same effects.

Namely, because the BD sensor 9 is fixed directly to the optical box 13 in the present embodiment, it can be mounted with high accuracy, thus presenting an advantage that the auxiliary BD lens 92 used for correcting the mounting errors in Embodiment 1 as described above is not necessary.

As described, the present embodiment achieves a still lower-cost scanning optical apparatus while achieving the high-accuracy optical performance by mounting the optical box to the apparatus.

The light source means and the BD sensor are fixed to the optical box in the present embodiment, but the elemental components other than the photosensitive drum may also be fixed to the optical box similarly. This can achieve a further higher-accuracy scanning optical apparatus.

According to the present invention, by the arrangement of integrally forming the optical element (the BD lens consisting of the anamorphic lens) for focusing the beam for obtaining the synchronizing signal of image writing start position onto the scanned surface and the optical element (cylindrical lens) for focusing the beam in a linear image extending in the scan direction as described above, the entire apparatus can be designed in a compact configuration and the scanning optical apparatus that can perform high-accuracy optical scanning can be achieved.

Further, by the arrangement in the present invention that the light source means, the electric circuit for controlling it, and the detection element (BD sensor) are placed on a same electric board or on a flexible board, the scanning optical apparatus the whole of which is made compact and simplified can be achieved.

What is claimed is:

1. A scanning optical apparatus comprising:

a light source portion;

a deflector for deflecting a beam from said light source portion;

first optical means for converting the beam from said light source portion into a nearly parallel beam;

second optical means for focusing said nearly parallel beam into a linear image on a deflection/reflection facet of said deflector;

third optical means for converging a beam deflected by said deflector on a predetermined surface;

detecting means for detecting the beam deflected by said deflector; and fourth optical means for guiding the beam deflected by said deflector to said detecting means, wherein said fourth optical means and said second optical means are integrally formed, wherein said third optical means and said fourth optical means are provided separately from each other, and wherein the beam guided by said fourth optical means to said detecting means does not pass through said third optical means, and the beam converged by said third optical means does not pass through said fourth optical means.

2. A scanning optical apparatus according to claim 1, wherein said detecting means detects a synchronizing signal for determining a timing of modulation start of said light source portion.

3. A scanning optical apparatus according to claim 1, wherein said first optical means is a collimator lens.

4. A scanning optical apparatus according to claim 1, wherein said second optical means is a cylindrical lens.

5. A scanning optical apparatus according to claim 1, wherein said third optical means is an fθ lens.

6. A scanning optical apparatus according to claim 1, wherein said fourth optical means is an anamorphic lens.

7. A scanning optical apparatus according to claim 1, further comprising an electric circuit for controlling said light source portion, wherein said electric circuit and said detecting means are placed on a same electric board.

8. A scanning optical apparatus according to claim 1, wherein said light source portion and said detecting means are combined by a flexible board.

9. A laser beam printer comprising:

a light source portion;

a deflector for deflecting a beam from said light source portion;

first optical means for converting the beam from said light source portion into a nearly parallel beam;

second optical means for focusing said nearly parallel beam into a linear image on a deflection/reflection facet of said deflector;

a recording medium;

third optical means for converging a beam deflected by said deflector on said recording medium;

detecting means for detecting the beam deflected by said deflector; and fourth optical means for guiding the beam deflected by said deflector to said detecting means, wherein said fourth optical means and said second optical means are integrally formed, wherein said third optical means and said fourth optical means are provided separately from each other, and wherein the beam guided by said fourth optical means to said detecting means does not pass through said third optical means, and the beam converged by said third optical means does not pass through said fourth optical means.

10. A laser beam printer according to claim 9, wherein said detecting means detects a synchronizing signal for determining a timing of modulation start of said light source portion.

11. A laser beam printer according to claim 9, wherein said first optical means is a collimator lens.

12. A laser beam printer according to claim 9, wherein said second optical means is a cylindrical lens.

13. A laser beam printer according to claim 9, wherein said third optical means is an fθ lens.

14. A laser beam printer according to claim 9, wherein said fourth optical means is an anamorphic lens.

15. A laser beam printer according to claim 9, further comprising an electric circuit for controlling said light source portion, wherein said electric circuit and said detecting means are placed on a same electric board.

16. A laser beam printer according to claim 9, wherein said light source portion and said detecting means are combined by a flexible board.

* * * * *

UNITED STATES PATENT AND TRADEMARK OFFICE
CERTIFICATE OF CORRECTION

PATENT NO.  : 5,963,356

DATED       : October 5, 1999

INVENTOR(S) : MANABU KATO

It is certified that error appears in the above-identified patent and that said Letters Patent is hereby corrected as shown below:

COVER PAGE: [56] REFERENCES CITED: FOREIGN PATENT DOCUMENTS:

"1282516" should read --1-282516--;

"404281421" should read --4-281421--;

"6003610 6/1992" should read --6-3610 1/1994--;

"0448123 9/1991 Japan" should read --0448133 9/1991 European Pat. Off.--; and

"5364547" should read --5-346547--.

COLUMN 2:
Line 33, "apparats" should read --apparatus--.

UNITED STATES PATENT AND TRADEMARK OFFICE
CERTIFICATE OF CORRECTION

PATENT NO. : 5,963,356

DATED : October 5, 1999

INVENTOR(S) : MANABU KATO

It is certified that error appears in the above-identified patent and that said Letters Patent is hereby corrected as shown below:

COLUMN 4:
    Line 24, "deflected" should read --being deflected--.

COLUMN 5:
    Line 39, "Et" should read --It--.

Signed and Sealed this

Twelfth Day of December, 2000

Attest:

Q. TODD DICKINSON

*Attesting Officer*     *Director of Patents and Trademarks*